United States Patent
Harper et al.

(10) Patent No.: US 9,658,875 B2
(45) Date of Patent: May 23, 2017

(54) ANTI-COLLOCATING MULTIPLE VIRTUAL ENTITIES USING PRIORITIZED GRAPH COLORING AND ITERATIVE PLACEMENT

(71) Applicant: International Business Machines Corporation, Armonk, NY (US)

(72) Inventors: Richard E. Harper, Chapel Hill, NC (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 14/701,678

(22) Filed: May 1, 2015

(65) Prior Publication Data

US 2016/0321096 A1 Nov. 3, 2016

(51) Int. Cl.
*G06F 9/455* (2006.01)
*G06F 9/46* (2006.01)
*G06F 15/173* (2006.01)
*H04L 29/08* (2006.01)

(52) U.S. Cl.
CPC .. *G06F 9/45558* (2013.01); *G06F 2009/4557* (2013.01); *G06F 2009/45595* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2011/0225277 A1* | 9/2011 | Freimuth | ........... | G06F 9/45558 709/223 |
| 2013/0263120 A1* | 10/2013 | Patil | ........... | G06F 9/45558 718/1 |
| 2014/0068609 A1* | 3/2014 | Breitgand | ........... | G06F 9/45533 718/1 |

OTHER PUBLICATIONS

Anand et al., Virtual Machine Placement optimization supporting performance SLAs, 2013 IEEE International Conference on Cloud Computing Technology and Science, pp. 298-304.
Shi et al., Optimal Placement of Virtual Machines With Different Placement Constraints in IaaS Clouds, Date of Conference Jul. 4-5, 2012, Dublin, ICT and Energy Efficiency and Workshop on Information Theory and Security (CIICT 2012), 6 pages.
(Continued)

*Primary Examiner* — Bing Zhao
(74) *Attorney, Agent, or Firm* — Schmeiser, Olsen & Watts, LLP; Noah A. Sharkan

(57) ABSTRACT

A method and associated systems for anti-collocating multiple virtual entities in a cloud-computing environment. A computerized cloud-configuration system receives a list of virtual machines to be placed in a cloud and a set of anti-collocation rules that identify combinations of machines that may not be placed in a same location. Each virtual machine is assigned a priority and the machines are organized into groups as a function these priorities. The groups are processed sequentially in priority order, and a color is assigned to each virtual machine in each group. Any machine not constrained by an anti-collocation rule is assigned a default "most popular" color. Constrained machines are each assigned a color that is not already used by any other machine with which it is anti-collocated. The virtual machines in each group are then placed in the cloud in order of color, with the populous colors being assigned first.

12 Claims, 3 Drawing Sheets

(56) References Cited

OTHER PUBLICATIONS

Shi et al., Provisioning of Requests for Virtual Machine Sets with Placement Constraints in IaaS Clouds, 978-3-901882-50-0 copyright 2013 IFIP, pp. 499-505.
Tsakalozos et al., Hint-Based Execution of Workloads in Clouds with Nefeli, IEEE Transactions on Parallel and Distributed Systems, vol. 24, No. 7, Jul. 2013, pp. 1331-1340.

* cited by examiner

ANTI-COLLOCATING MULTIPLE VIRTUAL ENTITIES USING PRIORITIZED GRAPH COLORING AND ITERATIVE PLACEMENT

TECHNICAL FIELD

The present invention relates to optimizing a network-management system and, in particular, refers to efficiently provision ing virtualized resources that are subject to anti-collocation constraints.

BACKGROUND

In many types of networked, distributed, or cloud-based computing environments, anti-collocation constraints dictate how or where resources may be provisioned, installed, or otherwise located. An anti-collocating constraint that, for example, bars two high-end print servers from being installed on a same LAN backbone segment, would have to be considered before deciding where to install a new print server. Anti-collocation rules can provide many other types of constraints, such as specifying, in a cloud-computing environment, that two specific types of virtual machines cannot be provisioned on a same physical platform.

In larger implementations that comprise large numbers of resources distributed across many platforms, subnetworks, physical resources, or virtualized computing environments, it can be difficult to efficiently accommodate the numerous anti-collocation rules that may arise.

These issues are especially relevant in a cloud-computing environment, where applications and virtualized computers, peripherals, and other virtual infrastructure may be provisioned and reprovisioned frequently. Anti-collocation rules may, for example, be used to improve a cloud's resiliency to failure of a physical resource on which one or more mission-critical virtual entities are provisioned. In one example, if two or more redundant virtual entities of a fault-resilient group are located on a same physical entity, the resulting single point of failure of could eliminate the fault-recovery benefits of such a resilient group.

These challenges become more complex when it is necessary to prioritize the order in which components or resources of a workload are added to a system pool. Such placement priorities may arise reasons that include a component's or resource's: relative business impact revenue-generation potential; or importance to a customer. In such cases, prioritization constraints may require a higher-priority workload to be placed, implemented, installed or provisioned such that the workload is able to access resources before they are consumed by lower-priority workloads.

Although these issues are relevant to provisioning virtual machines on physical hosts, they exist when provisioning any virtualized resource on any physical resource for which anti-collocation is required. Furthermore, analogous considerations must be taken into account when locating any sort of physical or virtual resource that is subject to anti-collocation constraints.

BRIEF SUMMARY

A first embodiment of the present invention provides a computerized cloud-configuration system comprising a processor, a memory coupled to the processor, a computer-readable hardware storage device coupled to the processor, one or more interfaces to a cloud-management platform that manages one or more physical or virtual components of a cloud-computing environment, and an interface to a network-management facility, the storage device containing program code configured to be run by the processor via the memory to implement a method for anti-collocating multiple virtual entities using prioritized graph coloring and iterative placement, the method comprising:

the system receiving a list of virtual machines, a set of priorities, and a set of rules, wherein each virtual machine of the list is capable of being placed on a physical or virtual component of the cloud-computing platform, wherein each virtual machine of the list is associated with a priority of the set of priorities, and wherein each rule of the set of rules identifies an anti-collocation constraint of a set of constraints that bars placing two or more virtual machines of the list of virtual machines a same platform;

the system representing the virtual machines comprised by the list and the set of rules as an undirected graph;

the system organizing the virtual machines comprised by the list into a set of groups;

the system associating a color of a set of colors with each virtual machine comprised by a first group of the set of groups;

the system ordering the set of colors as a function of a number of virtual machines associated with each color of the set of colors; and the system placing each virtual machine comprised by the first group on a component of the one or more physical or virtual components of a cloud-computing environment.

A second embodiment of the present invention provides method for anti-collocating multiple virtual entities using prioritized graph coloring and iterative placement, the method comprising:

the system receiving a list of virtual machines, a set of priorities, and a set of rules, wherein each virtual machine of the list is capable of being placed on a physical or virtual component of the cloud-computing platform, wherein each virtual machine of the list is associated with a priority of the set of priorities, and wherein each rule of the set of rules identifies an anti-collocation constraint of a set of constraints that bars placing two or more virtual machines of the list of virtual machines a same platform;

the system representing the virtual machines comprised by the list and the set of rules as an undirected graph, wherein each virtual machine of the list of virtual machines is represented as a node of the graph and each rule of the set of rules is represented as an edge of the graph, and wherein an first edge of the graph that connects a first pair of nodes of the graph represents an anti-collocation constraint of the set of rules that bars placing a first pair of virtual machines of the list of virtual machines on a same component of the one or more physical or virtual components, and wherein the first pair of nodes represents the first pair of virtual machines;

the system organizing the virtual machines comprised by the list into a set of groups;

the system associating a color of a set of colors with each virtual machine comprised by a first group of the set of groups;

the system ordering the set of colors as a function of a number of virtual machines associated with each color of the set of colors; and the system placing each virtual machine comprised by the first group on a component of the one or more physical or virtual components of a cloud-computing environment.

A third embodiment of the present invention provides a computer program product, comprising a computer-readable hardware storage device having a computer-readable program code stored therein, the program code configured to be executed by a computerized cloud-configuration system comprising a processor, a memory coupled to the processor, a computer-readable hardware storage device coupled to the processor, one or more interfaces to a cloud-management platform that manages one or more physical or virtual components of a cloud-computing environment, and an interface to a network-management facility, the storage device containing program code configured to be run by the processor via the memory to implement a method for anti-collocating multiple virtual entities using prioritized graph coloring and iterative placement, the method comprising:

the system receiving a list of virtual machines, a set of priorities, and a set of rules, wherein each virtual machine of the list is capable of being placed on a physical or virtual component of the cloud-computing platform, wherein each virtual machine of the list is associated with a priority of the set of priorities, and wherein each rule of the set of rules identifies an anti-collocation constraint of a set of constraints that bars placing two or more virtual machines of the list of virtual machines a same platform;

the system representing the virtual machines comprised by the list and the set of rules as an undirected graph, wherein each virtual machine of the list of virtual machines is represented as a node of the graph and each rule of the set of rules is represented as an edge of the graph, and wherein an first edge of the graph that connects a first pair of nodes of the graph represents an anti-collocation constraint of the set of rules that bars placing a first pair of virtual machines of the list of virtual machines on a same component of the one or more physical or virtual components, and wherein the first pair of nodes represents the first pair of virtual machines;

the system organizing the virtual machines comprised by the list into a set of groups;

the system associating a color of a set of colors with each virtual machine comprised by a first group of the set of groups;

the system ordering the set of colors as a function of a number of virtual machines associated with each color of the set of colors; and the system placing each virtual machine comprised by the first group on a component of the one or more physical or virtual components of a cloud-computing environment.

DETAILED DESCRIPTION

Figure 1:
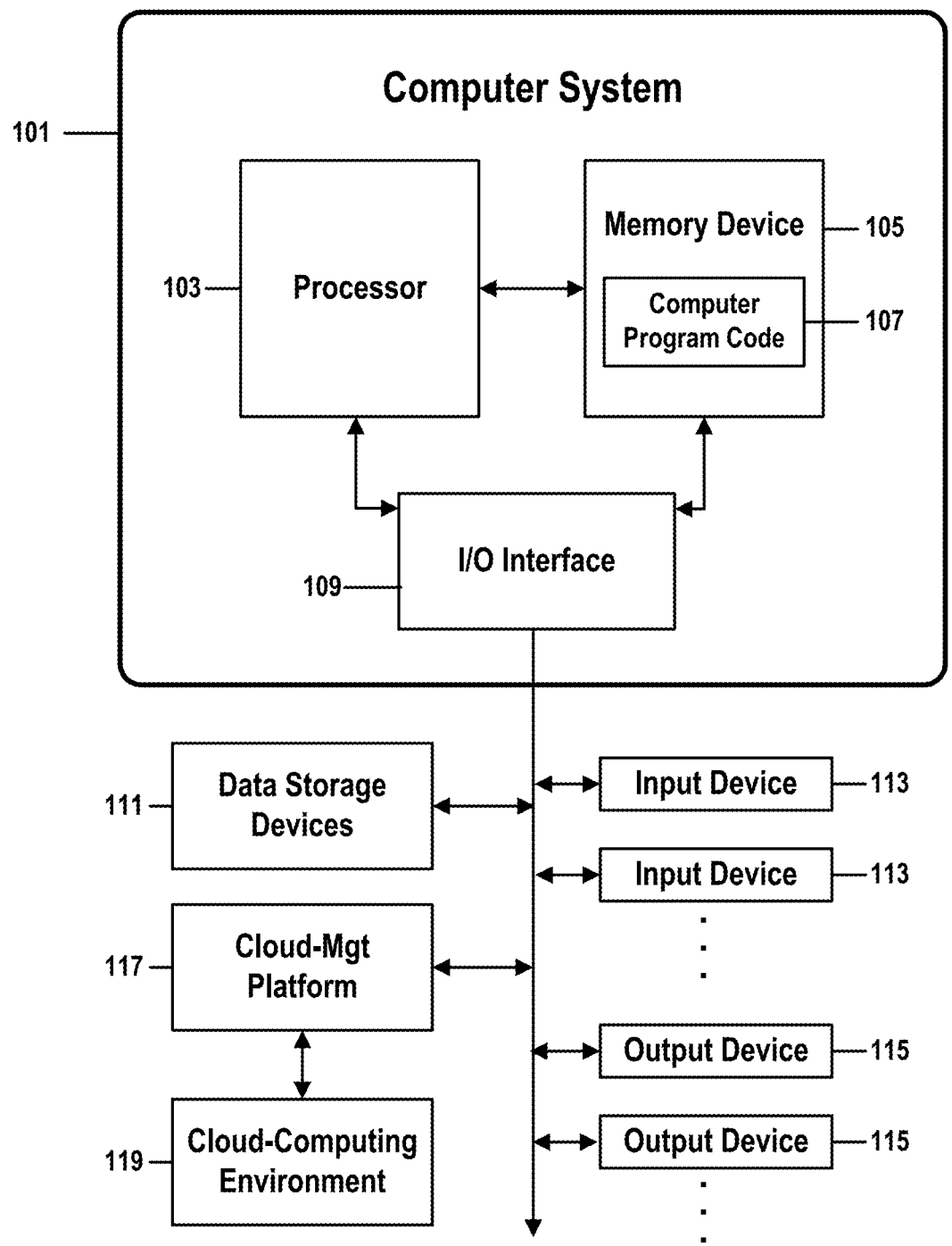
FIG. 1 shows a structure of a computer system and computer program code that may be used to implement a method for anti-collocating multiple virtual entities using prioritized graph coloring and iterative placement in accordance with embodiments of the present invention.

Embodiments of the present invention solve the problems described above. In a cloud-computing environment, for example, an embodiment of the present invention may increase or optimize a probability that no anti-collocation constraints are violated when provisioning a set of virtual machines onto physical hosts, and that the machines are provisioned in accordance with prioritization rules that associate relative priorities to the machines or to workloads associated with the machines.

Embodiments may use a graph-coloring method to organize such virtual machines or other resources into two or more color sets as a function of anti-collocation constraints, where elements of each color set share a common set color assigned by the graph-coloring method. Elements of each set may then be associated with specific locations as a function of a placement-optimizing methodology known to those skilled in the art.

Embodiments may also, prior to provisioning or installation, further organize elements of one or more of the color sets according to a set of priority assignments, such that the embodiment positions, places, locates, or provisions all elements associated with a higher priority, or associated with a higher-priority workload, before any elements associated with a lower priority or with a lower-priority workload. Such embodiments perform these priority-dependent organization steps without violating any of the aforementioned anti-collocation rules.

Embodiments of the present invention perform these functions through an iterative procedure that places or locates each resource in an optimal location through successive iterations of the procedure, and where each iteration determines additional placement locations as a function of a result of a prior iteration.

Furthermore, embodiments may further optimize and select a location, allocation, or placement of a resource as a function of a capacity consideration. Here, the term "capacity" may to refer to any limited or consumable resource, such as a virtual processor, computer memory, storage capacity, networking address space, a virtual LAN resource, or other such network resources. In other words, an embodiment may determine, at least in part, where to place a resource based on a determination of whether doing so would result in consumption of an already burdened limited or consumable when other, more readily available, instances of a comparable resource are available.

Embodiments may also accommodate deployment requests that would overcommit certain resources. Such an embodiment may accomplish this task by artificially deflating a resource requirement of a virtual machine or other entity to be placed If, for example, placing all requested virtual machines on a virtual LAN would be impossible due to insufficient physical memory capacity of host computers associated with that LAN, an embodiment might automatically, or in response to an operator's manual data entry, reconfigure (or "deflate") a memory requirement of some or all of those virtual machines such that they would not exceed the memory capacity of available physical hosts. In some embodiments, this deflation may be performed automatically as a function of criteria that may include a requirement of a business-defined application, a user priority level, or a term of a service agreement.

Embodiments of the present invention thus provide a novel and non-obvious combination of a graph-coloring-based anti-collocation mechanism with optimized scheduling, resource-consumption, and entity-placement features.

Embodiments may further improve an efficiency of this procedure by creating and managing a set of "anti-collocation graphs," where each such graph may be represented as a directed or undirected graph or by some other type of data structure known to those skilled in the art. In some embodiments, each anti-collocation graph may represent all virtual machines or other resources that are constrained by one anti-collocation rule of a set of anti-collocation rules.

Consider, for example, an anti-collocation rule that constrains ten virtual machines (or their associated workloads) such that no two virtual machines may be collocated. If that rule is represented as an undirected graph, each node in the graph might represent one of those ten virtual machines, and an edge of the graph might connect a pair of nodes that represent two virtual machines that the rule does not allow to be collocated or otherwise placed on a same location of a network or cloud.

In other embodiments, additional parameters may be accommodated in a directed graph that represents values of the additional parameters as a function of a direction of an edge of the graph. Such an embodiment might, for example, represent a dependency, an implementation order, a relative priority, or an other relationship between a pair of virtual machines as a function of a direction of an edge between two nodes that represent those virtual machines. In another example, a directed edge between nodes that represent two virtual machines might represent an order in which the two machines should be placed, or might indicate that only one of those machines may be moved after its initial placement.

Such an embodiment of the present invention may, through the course of its repeated iterations, improve its efficiency by further maintaining a list of locations already assigned to virtual machines represented by nodes of an anti-collocation graph. By excluding those locations from consideration when placing other resources represented by the same graph in a subsequent iteration, the embodiment may decrease the number of steps it must perform.

FIG. 1 shows a structure of a computer system and computer program code that may be used to implement a method for anti-collocating multiple virtual entities using prioritized graph coloring and iterative placement in accordance with embodiments of the present invention. FIG. 1 refers to objects 101-119.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Computer system 101 is also connected, via means known to those skilled in the art, to a cloud-management platform 117, which in turn manages aspects of a cloud-computing environment 119. The cloud-management platform 117 may monitor states, configurations, operating status, and other characteristics of physical or virtualized resources, components, or infrastructure comprised by the cloud-computing environment. In particular, the cloud-management platform 117 may be able to monitor or determine the location within the cloud-computing environment where each physical or virtual element of the cloud is placed.

The management platform 117 may, for example, store a list of IP addresses, MAC addresses, host names, physical host, or other information from which a physical or virtual topology of the cloud platform 119 may be identified or inferred. In such embodiments, "placing" a resource, such as a virtual machine, may refer to an identification of an IP address, bus segment, physical host, or other information that identifies the virtual machine's location or connectivity within the virtualized or physical structure of the cloud 119. Similarly, placing a physical resource in or on the cloud-computing environment 119 might comprise identifying an address, network, or other information that identifies a location where that physical resource resides in the physical layer of the cloud-computing environment 119.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for anti-collocating multiple virtual entities using prioritized graph coloring and iterative placement in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for anti-collocating multiple virtual entities using prioritized graph coloring and iterative placement.

Any of the components of the present invention could be created, integrated, hosted, maintained, deployed, managed, serviced, supported, etc. by a service provider who offers to facilitate a method for anti-collocating multiple virtual entities using prioritized graph coloring and iterative placement. Thus the present invention discloses a process for deploying or integrating computing infrastructure, comprising integrating computer-readable code into the computer system 101, wherein the code in combination with the computer system 101 is capable of performing a method for anti-collocating multiple virtual entities using prioritized graph coloring and iterative placement.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for anti-collocating multiple virtual entities using prioritized graph coloring and iterative placement may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for anti-collocating multiple virtual entities using prioritized graph coloring and iterative placement data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
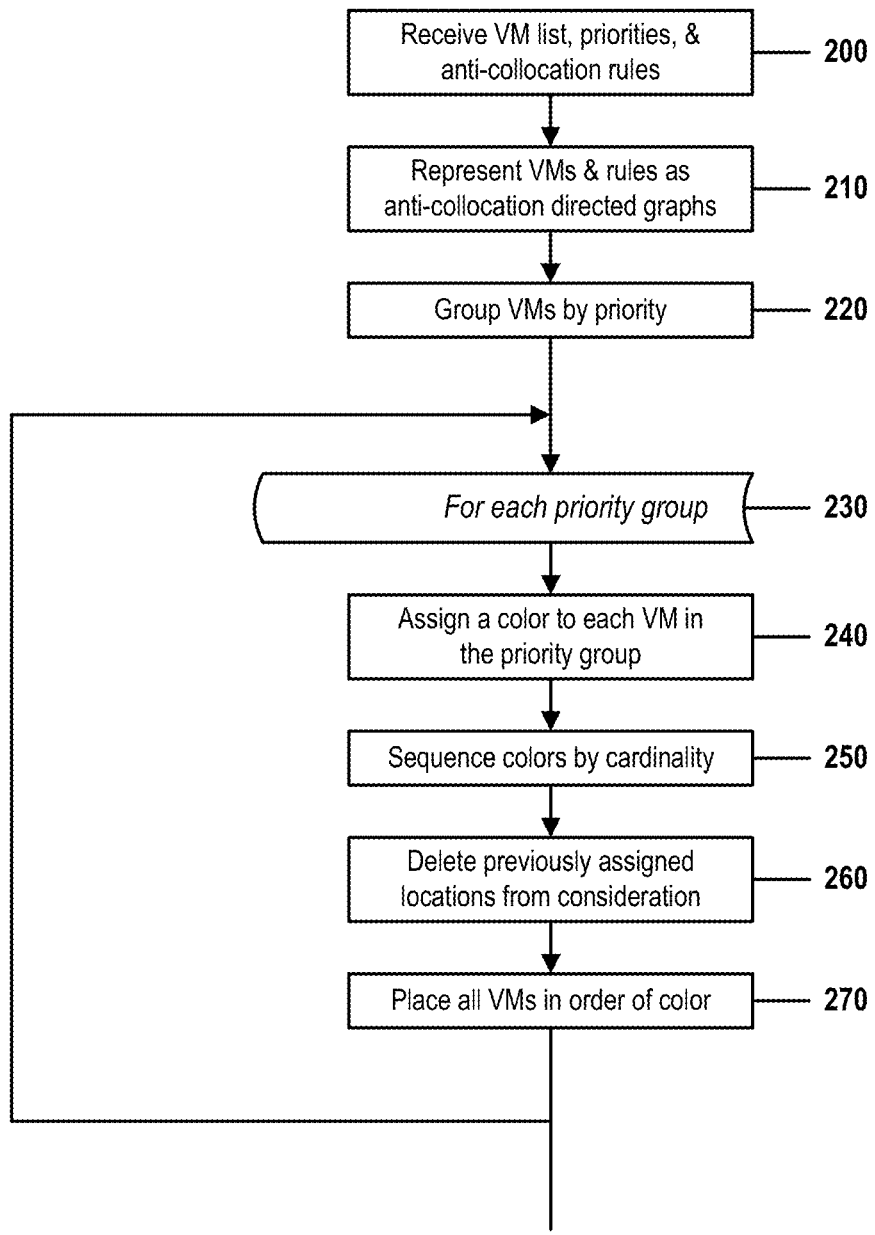
FIG. 2 is a flow chart that illustrates the steps of a method for anti-collocating multiple virtual entities using prioritized graph coloring and iterative placement in accordance with embodiments of the present invention.

FIG. 2 is a flow chart that illustrates steps of a method for anti-collocating multiple virtual entities using prioritized graph coloring and iterative placement in accordance with embodiments of the present invention. FIG. 2 contains steps 200-270.

In step 200 a cloud-configuration system receives information that comprises:

a list of physical or virtual resources that must be placed in a cloud-computing environment. As is known to those skilled in the art, if one of these resources is, for example, a virtual machine, placing it in the cloud-computing environment may comprise identifying a physical host onto which the virtual machine is provisioned. Similarly, if one of these resources is a physical infrastructure component, placing it in the cloud-computing environment may comprise identifying an IP address, MAC address, hostname, local-area network, or other component of the cloud-computing environment that underlies the cloud's virtualization layer and that would interface the physical component to the cloud's other hardware components. Although this document refers, in examples below, to receiving a list of virtual machines in this step, those references should thus not be construed to limit embodiments to placement of only virtual machines.

a set of priorities, each of which identifies a relative importance of one or more resources comprised by the list of resources received in step 200. Here, a resource that has a higher priority may have preference during placement over a resource that has a lower priority.

and a set of anti-collocation rules, each of which identifies a constraint placed upon two or more resources of the list of resources received in step 200.

In one example, a system in this step might receive a list of ten virtual machines to be placed in a cloud, a set of ten priorities, each of which is associated with one of the virtual machines in the list, and a set of two anti-collocation rules, one of which prohibits placement of a first virtual machine of the list and a second virtual machine of the list on a same host computer, and the second of which prohibits placing the first virtual machine and a third virtual machine of the list on a same host computer.

In this example, there are no constraints on the seven virtual machines that are not identified by either of the two anti-collocation rules, but, once the first virtual machine is placed on a host, neither the second nor the third virtual machine may be placed on that same host.

In step 210, the system creates an undirected graph that represents the information received in step 200. Each node of the graph represents one of the resources identified in the list received in step 200 and each edge of the graph represents an anti-collocation relationship, identified by a rule of the set of anti-collocation rules received in step 200, between two resources represented by the two nodes connected by that edge.

Continuing the preceding example, the system would in step 210 generate a graph that contains ten nodes, each of which represents one of the ten virtual machines identified by the list received in step 200. Because seven of the nodes are not identified by any of the anti-collocation rules received in step 200, those nodes would be unconnected by an edge to any other nodes. In some embodiments, those seven nodes might be omitted entirely from the graph.

Because one of the received rules in this example identifies an anti-collocation relationship between the first and second virtual machines, the two nodes of the graph that represent the first and second virtual machines would be connected by a first edge. Similarly, because the other received rule in this example identifies an anti-collocation relationship between the first and third virtual machines, the two nodes of the graph that represent the first and third virtual machines would also be connected by a first edge.

In some embodiments, the system may produce disjoint graphs, where at least one graph represents a single anti-collocation relationship that comprises resources not represented by any of the other graphs. In variations of such embodiments, a same resource may be represented in multiple graphs if it is identified as being in more than one anti-collocation relationships. In some embodiments, the system may represent the information received in step 200 as a directed graph, in which a direction of an edge identifies a further characteristic of an anti-collocation relationship, of two resources in such a relationship, or of some other implementation-dependent characteristic of the resources to be placed.

In step 220, the resources in the list received in step 200 would be organized by priority into groups. In its simplest form, this would entail creating a first group that contains all resources associated with a highest priority level, a second group that contains all resources associated with next-highest priority level, and so forth, such that a last group contains all resources associated with a lowest priority level.

In more complex environments, this organizing may be performed as a function of the set of priorities received in step 200. A first group might, for example, contain all resources that are associated with any of three highest priority levels. In another example, two groups might each contain half of the resources that are associated with one particular priority level, where one group contains only virtual machines and the other group contains components of physical infrastructure.

In some embodiments, a priority may be associated with a resource as a function of a business goal, of a technical or financial constraint, of a performance consideration, or in an arbitrarily defined manner.

Step 230 initiates an iterative procedure of steps 230 through 270. This procedure is performed once for each priority group defined in step 220. In some embodiments, iterations of this procedure are performed in priority order. That is, a first iteration is performed upon a group containing resources associated with a highest priority, a second iteration is performed upon a group containing resources associated with a next-highest priority, and so forth. At the conclusion of the final iteration of this iterative procedure, the method of FIG. 2 ends.

In step 240, a value of an arbitrarily chosen parameter is associated with each resource contained by the current priority group. In the examples below, we refer to that parameter as a "color" of a resource, but this parameter is chosen only to make the FIG. 3 assignment steps easier to understand. Other embodiments might instead associate each resource with an arbitrary alphanumeric identifier, or with any other type of parameter that may be used to distinguish elements of a set, such as the "spin," "color," "strangeness," "charm," and other arbitrarily chosen parameters used in physics to identify characteristics of elementary particles.

Here, we choose to associate each resource with a "color" because of the familiarity of most readers with well-known procedures, such as map-coloring, that involve distinguishing elements of a set by assigning different colors to adjacent elements. Although embodiments of the present invention comprise features not found in known map-coloring algorithms, organizing resources as a function of assigned colors is an intuitive metaphor that will be used exclusively in FIG. 3 and in the remainder of FIG. 2.

Figure 3:
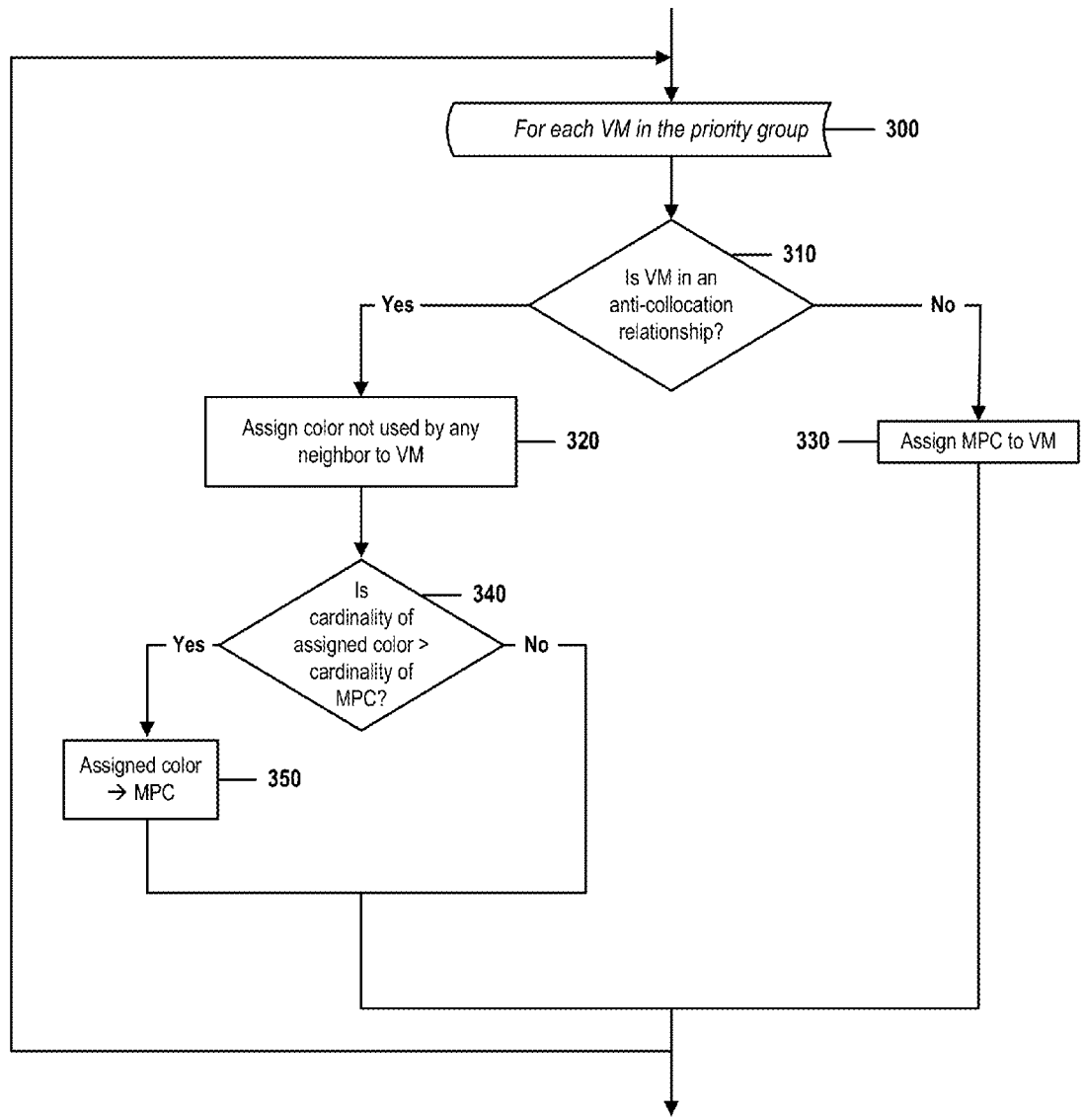
FIG. 3 is a flow chart that illustrates in greater detail a method for assigning a color to a resource, in accordance with embodiments of the present invention.

FIG. 3 describes in greater detail how step 240 determines which colors to assign to each resource to be placed.

In step 250, the system determines how many resources of the priority group are associated with each color and orders the colors by cardinality. In the ongoing example, if three of the ten virtual machines are designated "blue," four are designated "red," two are designated "white," and one is designated "yellow," the colors would be ordered in an ordered sequence (red, blue, white, yellow), as a function of a decreasing number of virtual machines associated with each color.

In other embodiments, colors maybe ordered as a different, or implementation-dependent, function of cardinalities of each color, but in all cases, the ordering will depend at least in part on a number of resources associated with each color.

In step 260, certain potential placement locations may be removed from consideration when the system attempts, in step 270, to place a resource of a certain color. In embodiments that incorporate this step, the system would first identify, before attempting in step 270 to place a first resource of the current priority group, whether that resource shares an anti-collocation relationship with any other resources that have already been placed. In other words, the system here determines whether any other resources in the anti-collocation graph created for that first resource in step 210 have already been placed. If the system finds that the first resource is in an anti-collocation relationship with a second resource that has already been placed at a first placement location, then the system removes from that first location from consideration when attempting to place the first resource. In this way, further steps of the present invention avoid unnecessarily considering placement locations that would violate an anti-collocation constraint.

An example of this procedure is presented below in the description of step 270.

In step 270, all resources of the current priority group are placed in order of color. In the preceding example, the four red virtual machines would be placed first, the three blue machines next, the two white machines after the blue, and the one yellow machine last. In each case, the anti-collocation relationships represented by the graphs of each virtual machine to be placed would be satisfied by ensuring that no two virtual machines of the same color are placed on the same placement location. In a case in which the resources are virtual machines and the placement locations are host processors, no host would be provisioned with two virtual machines associated with a same color.

As described above, step 260 may improve the efficiency of step 270 by first eliminating from consideration a subset of possible placement locations for each resource to be placed.

In our ongoing example, where first and third virtual machines are represented by a same anti-collocation graph, if the third machine has already been placed on host "H0020," then the system would omit host "H0020" from consideration as a possible placement location for the first virtual machine. The identification, tracking, or deletion tasks may be performed by any means known in the art. An embodiment may, for example create a "do not place" list for a first virtual machine that lists hosts or other types of placement locations that should not be considered when attempting to place the first virtual machine.

In some embodiments, if the system performs step 260 for all resources of a specific color, it will produce a set of "do not place" constraints for all resources associated with that color.

Step 270 places each subset of resources that share a common color by means of a placement algorithm. This algorithm may be chosen or designed as a function of implementation-dependent factors, or it may be a variation of a placement algorithm known in art, such as an energy-optimizing bin packing algorithm, a performance-optimizing workload balancing algorithm, a utility function-based algorithm, or any other placement algorithm appropriate for the particular domain of the embodiment. Regardless of the algorithm chosen, this method ensure that no resources of a same color are related by an anti-collocation constraint.

An advantage of this invention is that it decouples such placement algorithms from the overarching resource optimization method of FIGS. 2 and 3. In other words, methods of the present invention may be fine-tuned to incorporate any desired optimization algorithm, related business goals, or other criteria.

FIG. 3 is a flow chart that illustrates in greater detail a method for assigning a color to a resource, as described in step 240 of FIG. 2. As noted in the above description of steps 230-270 of FIG. 3, a method of FIG. 3 is performed for once for each priority group identified in step 220. FIG. 3 contains steps 300-350.

Step 300 initiates an iterative procedure of steps 300-350 that is performed once for each resource of the current priority group. Examples below identify embodiments in which each resource is a virtual machine, but, as described above, these references should not be construed to limit embodiments of the present invention to implementations that place only virtual machines in a cloud-computing environment.

Step 310 determines whether the resource currently under consideration is identified by any anti-collocation rule received in step 200. If it is not, the iterative procedure continues with step 330 and then begins its next iteration. If the resource is identified by a rule, the procedure continues instead with steps 320-350, after which it begins the next iteration.

In step 330, if the system in step 310 determined that the resource currently under consideration is not identified by any anti-collocation rule, the system then associates the resource with a "most popular" color (MPC). The MPC may be any arbitrarily chosen value of the color parameter or of an other parameter used by an embodiment in place of "color."

In some embodiments, the MPC may identify a particular color (or a particular value of the other parameter) that is associated with a greatest number of resources. If, for example, 60% of all resources to be placed are associated with a color "white" or, in other embodiments, with a spin of "up," then "white" or "up" would be designated to be "most popular." In such a case, the system in step 330 would automatically assign the resource found to have no anti-collocation constraints to have a "most popular" color value of "white" or a spin value of "up." The system would then continue with a next iteration of the iterative procedure of steps 300-350 in order to select a color for a next resource of the current priority group.

In step 20, if the system in step 310 determined that the resource currently under consideration is identified by an anti-collocation rule, the system associates the resource with a color (or a value of a parameter that an embodiment uses instead of "color") that is not already associated with any other resource associated with the resource under consideration.

In our earlier ongoing example of FIG. 2, if the first, second, and third virtual machines are related by anti-collocation rules, and thus share a same undirected graph, if the first virtual machine has been deemed "white" and the second virtual machine has been deemed "black," then the third virtual machine may be associated with any color other than "white" or "black."

In some embodiments, the system may further bar that third virtual machine from being associated with the "most popular" color because the third virtual machine is identified by an anti-collocation rule.

In step 340, the system determines whether the previously identified "most popular" color (or value of the other parameter) is still associated with a greater number of resources than are associated with any other color or value.

Consider, for example, a case in which the a identified "most popular" color "white" is associated with 75 virtual machines and and a color "blue" is associated with 74 virtual machines. If two most-recent iterations of the procedure of steps 300-350 had selected the color "blue" for two more virtual machines, step 340 would determine that the cardinality of the "blue" color (now associated with 76 virtual machines) currently exceeds the cardinality of the current "most popular" color (still associated with 75 virtual machines). In such an example, the method of FIG. 3 would then perform step 350 before initiating a next iteration of the procedure of steps 300-350.

If, in another variation, the system in step 340 had determined that, even after the most recently assignments of the color "blue," that "blue" is still not associated with a greater number of resources than is the current "most popular" color, then the current iteration of the method of FIG. 3 would end and the next iteration would begin with step 300.

At the conclusion of the last iteration of the method of FIG. 3, every resource comprised by the current priority group will have been assigned a color (or a value of an arbitrary parameter that an embodiment uses instead of "color"). Resources that are related by an anti-collocation constraint will have different colors, such that no two nodes of an undirected graph will be associated with a same color. This method will ensure that a smallest number of color sets are created, each of which comprises a largest, optimized, number of resources.

During the placement step 270 of FIG. 2, all resources associated with a particular color may be placed without regard to anti-collocation constraints because any two anti-collocated nodes will have been assigned different colors.

What is claimed is:

1. A computerized cloud-configuration system comprising a processor, a memory coupled to the processor, a computer-readable hardware storage device coupled to the processor, one or more interfaces to a cloud-management platform that manages one or more physical or virtual components of a cloud-computing environment, and an interface to a network-management facility, the storage device containing program code configured to be run by the processor via the memory to implement a method for anti-collocating multiple virtual entities using prioritized graph coloring and iterative placement, the method comprising:

the system receiving a list of virtual machines, a set of priorities, and a set of rules, wherein each virtual machine of the list is capable of being placed on a physical or virtual component of the cloud-computing platform, wherein each virtual machine of the list is associated with a priority of the set of priorities, and wherein each rule of the set of rules identifies an anti-collocation constraint of a set of constraints that bars placing two or more virtual machines of the list of virtual machines on a same platform;

the system representing the virtual machines comprised by the list and the set of rules as an undirected graph, wherein each virtual machine of the list of virtual machines is represented as a node of the graph and each rule of the set of rules is represented as an edge of the graph;

the system organizing the virtual machines comprised by the list into a set of groups, such that each group of the set of groups consists of virtual machines associated with a same priority of the set of priorities;

the system associating a color of a set of colors with each virtual machine comprised by a first group of the set of groups, such that a first virtual machine identified by a first rule of the set of rules is associated with a color not associated with any other virtual machine identified by the first rule;

the system ordering the colors of the set of colors as a function of a number of virtual machines associated with each color of the set of colors, wherein the ordered colors form a color list in which no first color of the list is associated with a greater number of virtual machines than is a color that follows the first color in the list; and the system placing, as a function of the ordering, each virtual machine comprised by the first group on a component of the one or more physical or virtual components of a cloud-computing environment, wherein the virtual machines are placed in an order corresponding to an order of colors of the color list, and wherein no two virtual machines associated with a same color are placed on a same component.

2. The system of claim 1, wherein first edge of the graph that connects a first pair of nodes of the graph represents an anti-collocation constraint of the set of rules that bars placing a first pair of virtual machines of the list of virtual machines on a same component of the one or more physical or virtual components, and wherein the first pair of nodes represents the first pair of virtual machines.

3. The system of claim 1, further comprising:
the system identifying a most popular color of the set of colors, such that a number of virtual machines of the list associated with the most popular color is greater than a number of virtual machines of the list associated with any other color of the set of colors.

4. The system of claim 3, further comprising:
the system confirming that an unconstrained virtual machine of the list of virtual machines is subject to no anti-collocation constraint identified by a rule of the set of rules identifies; and
the system associating the unconstrained virtual machine with the most popular color of the set of colors.

5. The system of claim 3, further comprising:
the system repeating the identifying the most popular color after each associating a color of the set of colors with a virtual machine of the list of virtual machines.

6. The system of claim 1, further comprising:
the system, prior to the associating, deleting from the first group any virtual machines that have already been placed on a component of the one or more physical or virtual components of a cloud-computing environment.

7. A method for anti-collocating multiple virtual entities using prioritized graph coloring and iterative placement, the method comprising:

a computerized cloud-configuration system receiving a list of virtual machines, a set of priorities, and a set of rules, wherein each virtual machine of the list is capable of being placed on a physical or virtual component of the cloud-computing platform, wherein each virtual machine of the list is associated with a priority of the set of priorities, and wherein each rule of the set of rules identifies an anti-collocation constraint of a set of constraints that bars placing two or more virtual machines of the list of virtual machines on a same platform;

the system representing the virtual machines comprised by the list and the set of rules as an undirected graph,
wherein each virtual machine of the list of virtual machines is represented as a node of the graph and each rule of the set of rules is represented as an edge of the graph, and
wherein first edge of the graph that connects a first pair of nodes of the graph represents an anti-collocation constraint of the set of rules that bars placing a first pair of virtual machines of the list of virtual machines on a same component of the one or more physical or virtual components, and wherein the first pair of nodes represents the first pair of virtual machines;

the system organizing the virtual machines comprised by the list into a set of groups, such that each group of the set of groups consists of virtual machines associated with a same priority of the set of priorities;

the system associating a color of a set of colors with each virtual machine comprised by a first group of the set of groups, such that a first virtual machine identified by a first rule of the set of rules is associated with a color not associated with any other virtual machine identified by the first rule;

the system ordering the colors of the set of colors as a function of a number of virtual machines associated with each color of the set of colors, wherein the ordered colors form a color list in which no first color of the list is associated with a greater number of virtual machines than is a color that follows the first color in the list; and the system placing, as a function of the ordering, each virtual machine comprised by the first group on a component of the one or more physical or virtual components of a cloud-computing environment, wherein the virtual machines are placed in an order corresponding to an order of colors of the color list, and wherein no two virtual machines associated with a same color are placed on a same component.

8. The method of claim 7, further comprising:
the system identifying a most popular color of the set of colors, such that a number of virtual machines of the list associated with the most popular color is greater than a number of virtual machines of the list associated with any other color of the set of colors.

9. The method of claim 8, further comprising:
the system confirming that an unconstrained virtual machine of the list of virtual machines is subject to no anti-collocation constraint identified by a rule of the set of rules identifies; and
the system associating the unconstrained virtual machine with the most popular color of the set of colors;
the system repeating the identifying the most popular color after each associating a color of the set of colors with a virtual machine of the list of virtual machines.

10. The method of claim 7, further comprising providing at least one support service for at least one of creating, integrating, hosting, maintaining, and deploying computer-readable program code in the computer system, wherein the computer-readable program code in combination with the computer system is configured to implement the receiving, the representing, the organizing, the ordering, and the placing.

11. A computer program product, comprising a computer-readable hardware storage device having a computer-readable program code stored therein, the program code configured to be executed by a computerized cloud-configuration system comprising a processor, a memory coupled to the processor, a computer-readable hardware storage device coupled to the processor, one or more interfaces to a cloud-management platform that manages one or more physical or virtual components of a cloud-computing environment, and an interface to a network-management facility, the storage device containing program code configured to be run by the processor via the memory to implement a method for anti-collocating multiple virtual entities using prioritized graph coloring and iterative placement, the method comprising:
the system receiving a list of virtual machines, a set of priorities, and a set of rules, wherein each virtual machine of the list is capable of being placed on a physical or virtual component of the cloud-computing platform, wherein each virtual machine of the list is associated with a priority of the set of priorities, and wherein each rule of the set of rules identifies an anti-collocation constraint of a set of constraints that bars placing two or more virtual machines of the list of virtual machines on a same platform;
the system representing the virtual machines comprised by the list and the set of rules as an undirected graph, wherein each virtual machine of the list of virtual machines is represented as a node of the graph and each rule of the set of rules is represented as an edge of the graph, and
wherein first edge of the graph that connects a first pair of nodes of the graph represents an anti-collocation constraint of the set of rules that bars placing a first pair of virtual machines of the list of virtual machines on a same component of the one or more physical or virtual components, and wherein the first pair of nodes represents the first pair of virtual machines;
the system organizing the virtual machines comprised by the list into a set of groups, such that each group of the set of groups consists of virtual machines associated with a same priority of the set of priorities;
the system associating a color of a set of colors with each virtual machine comprised by a first group of the set of groups, such that a first virtual machine identified by a first rule of the set of rules is associated with a color not associated with any other virtual machine identified by the first rule;
the system ordering the colors of the set of colors as a function of a number of virtual machines associated with each color of the set of colors, wherein the ordered colors form a color list in which no first color of the list is associated with a greater number of virtual machines than is a color that follows the first color in the list; and
the system placing, as a function of the ordering, each virtual machine comprised by the first group on a component of the one or more physical or virtual components of a cloud-computing environment, wherein the virtual machines are placed in an order corresponding to an order of colors of the color list, and wherein no two virtual machines associated with a same color are placed on a same component.

12. The computer program product of claim 11, further comprising:
the system identifying a most popular color of the set of colors, such that a number of virtual machines of the list associated with the most popular color is greater than a number of virtual machines of the list associated with any other color of the set of colors;
the system confirming that an unconstrained virtual machine of the list of virtual machines is subject to no anti-collocation constraint identified by a rule of the set of rules identifies; and
the system associating the unconstrained virtual machine with the most popular color of the set of colors.

\* \* \* \* \*